United States Patent [19]

Dorey

[11] Patent Number: 5,308,206
[45] Date of Patent: May 3, 1994

[54] PROTECTION NUT FOR A PUSH BUTTON

[75] Inventor: Michel Dorey, Saint Paul les Romans, France

[73] Assignee: Crouzet Automatismes, Valence, France

[21] Appl. No.: 968,863

[22] Filed: Oct. 30, 1992

[30] Foreign Application Priority Data

Oct. 31, 1991 [FR] France .................. 91 13955

[51] Int. Cl.$^5$ ............................ F16B 37/14
[52] U.S. Cl. .................. 411/429; 411/377; 74/566; 403/50
[58] Field of Search ........... 411/429, 430, 431, 377, 411/371, 373, 375, 376, 900, 901, 902, 903, 907; 277/178; 74/566, 18.2; 403/50

[56] References Cited

U.S. PATENT DOCUMENTS

| 2,568,056 | 9/1951 | Corder | 277/178 X |
| 2,786,359 | 3/1957 | Karlan et al. | 403/50 |
| 2,795,144 | 6/1957 | Morse | 411/431 X |
| 2,832,616 | 4/1958 | Morse | 411/902 X |
| 2,968,840 | 1/1961 | Morse | 411/901 X |
| 3,306,622 | 2/1967 | Liebig | 277/178 |
| 3,420,119 | 1/1969 | Morse | 74/566 |
| 3,471,158 | 10/1969 | Solins | 277/178 X |
| 4,292,876 | 10/1981 | De Graan | 411/901 X |

FOREIGN PATENT DOCUMENTS

| 0153487 | 9/1985 | European Pat. Off. . |
| 2509225 | 9/1976 | Fed. Rep. of Germany . |
| 1263548 | 2/1972 | United Kingdom . |

*Primary Examiner*—Rodney M. Lindsey
*Attorney, Agent, or Firm*—Lowe, Price, LeBlanc & Becker

[57] ABSTRACT

A protection nut for screwing on a stud in which a button slides, includes an approximately bell-shaped elastic membrane mounted to one face of the nut and fitted around or covering the button and an annular seal-ring mounted to the opposite face of the nut, the membrane and the seal-ring forming only one part and being connected together through at least one through-hole of the nut.

10 Claims, 2 Drawing Sheets

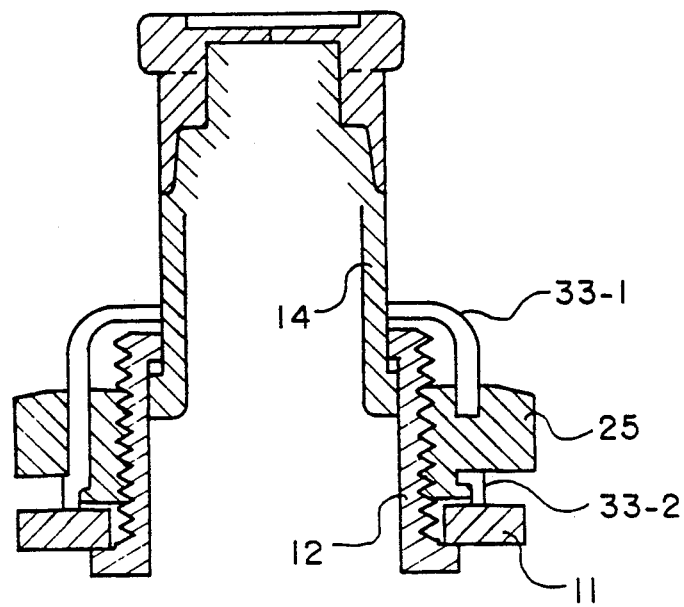
Fig. 3
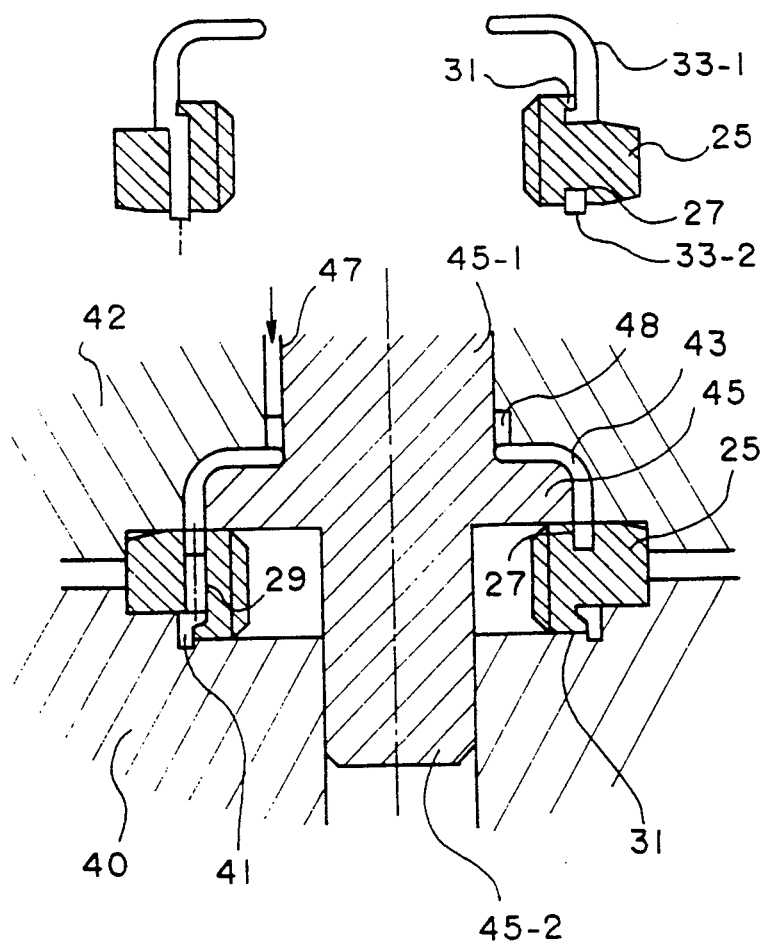
Fig. 5
Fig. 4

PROTECTION NUT FOR A PUSH BUTTON

FIELD OF THE INVENTION

The present invention relates to a protection nut for a push button, such as a circuit breaker triggering button, and in particular to a nut comprising an elastic membrane covering the button or fitted tightly around the button.

BACKGROUND OF THE PRIOR ART

FIG. 1 shows two half-section views of a conventional protection nut for a circuit breaker trigger button, two mounting modes being shown in the half-section views. A nut 10, fixing the circuit breaker to a plate 11, is screwed on a stud 12 forming part of the body of the not represented circuit breaker. A cylindrical trigger button 14 slides in stud 12. To ensure the tightness between the two faces of plate 11, a seal-ring 16 is pressed between the bottom face of nut 10 and the plate. Additionally a bell shaped elastic membrane 20 is fixed to the upper part of nut 10 and comprises a central orifice which is elastically fitted around button 14.

In the left section view of FIG. 1, membrane 20 is set in the nut. As shown a thin part 10-1 of nut 10 is bent and pinches the base of membrane 20. In the right section view, membrane 20 is hooked on nut 10. As shown, the base of membrane 20 is elastically maintained around an exterior shoulder 10-2 of the nut.

Such protection nuts are not practical to mount because there are initially three independent parts (nut 10, seal-ring 16 and membrane 20) to mount together. The mounting operations can be so long that they can cost approximately ⅜ of the price of the circuit breaker. Additionally, the three independent parts of the protection nut are generally not provided by the same suppliers, which causes tedious stock managing.

SUMMARY OF THE INVENTION

A principal object of the invention is to provide a protection nut which is particularly simple to mount.

Another object of the invention is to provide a one-piece protection nut.

These objects are achieved by providing, in a preferred embodiment, a protection nut for screwing on a stud in which a button slides, comprising an approximately bell-shaped elastic membrane mounted to one face of the nut and fitted around or covering the button and an annular seal-ring mounted to the opposite face of the nut, the membrane and the seal-ring forming only one part and being connected together through at least one through-hole of the nut.

According to a second embodiment of the invention, the base of the bell-shaped membrane is fitted in a groove of the nut, in which said holes open.

According to a third embodiment of the invention, the seal-ring is provided with an interior shoulder allowing it to be retained by an exterior shoulder of the nut.

According to a fourth embodiment of the invention, the base of the bell-shaped membrane is provided with an interior shoulder allowing it to be retained by an exterior shoulder of the nut.

According to a fifth embodiment of the invention, the seal-ring is fitted in said groove of the nut in which said holes open.

According to a sixth embodiment of the invention, said membrane comprises a central orifice through which said button is meant to pass and having an initial diameter smaller than that of the button.

According to a seventh embodiment of the invention, said membrane and said seal-ring are simultaneously obtained by only one introduction of moulding material in a mould containing said nut.

According to an eighth embodiment of the invention, a material for improving adherence is put in the groove before moulding.

BRIEF DESCRIPTION OF THE DRAWINGS

The foregoing and other objects, features and advantages of the invention are explained in more detail in the following description of preferred embodiments referring to the attached figures among which:

FIG. 3 shows the protection nut of FIGS. 2A and 2B mounted on a circuit breaker trigger button;

FIG. 4 shows a manufacturing method of a protection nut according to the invention; and FIG. 5 shows an alternate embodiment of that of FIG. 2A.

DESCRIPTION OF PREFERRED EMBODIMENTS

Figure 2A:
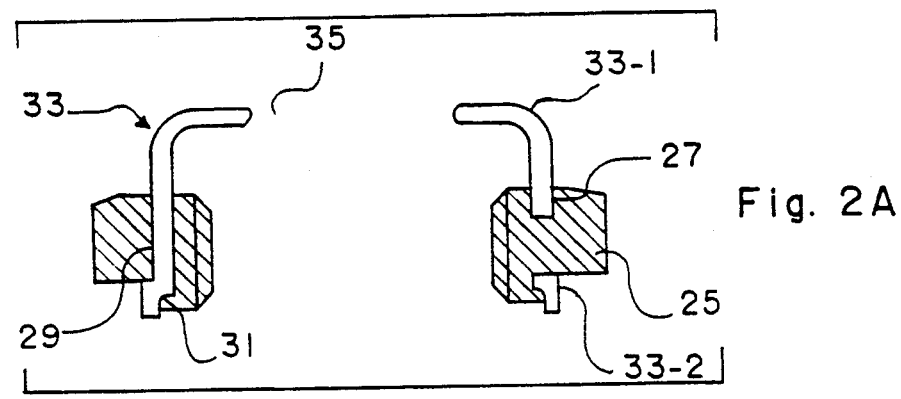
FIG. 2A and 2B respectively show a section view along line A—A and a top half-section view of an embodiment of a protection nut according to the invention.
Figure 2B:
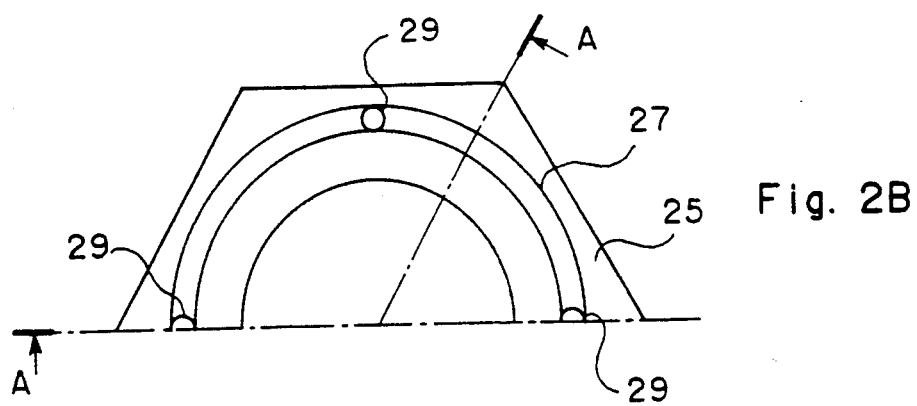

In FIGS. 2A and 2B, a nut 25 according to the invention comprises an annular groove 27 on it's upper face and a plurality of holes 29 (4 have been represented at 90 degrees) connecting the bottom of groove 27 to the bottom face of the nut. A central extension of the bottom face of nut 25 has, as shown, an exterior shoulder 31 facing the holes 29.

A supple membrane 33 comprises a bell-shaped upper portion 33-1 extending from groove 27 and having a central orifice 35. The diameter of central orifice 35 is smaller than the diameter of the button on which the protection nut is to be mounted so that the membrane fits elastically around the button. A button portion 33-2 of membrane 33 has an up-side down L shaped section adapted to the shape of shoulder 31, protrudes from the bottom limiting surface of nut 25 and is connected to the upper portion 33-1 through holes 29.

Figure 1:
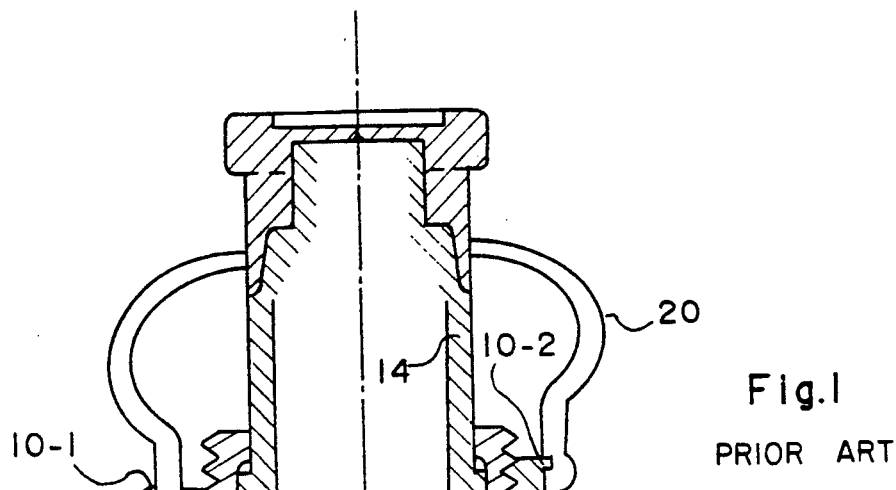
FIG. 1, previously described, shows two conventional alternatives of a protection nut mounted on a circuit breaker trigger button.

With this arrangement, upper portion 33-1 has the same function as membrane 20 of FIG. 1 and the bottom portion 33-2 has the same function as seal-ring 16 of FIG. 1, and these portions form with nut 25 only one part.

FIG. 3 shows the nut of FIGS. 2A and 2B mounted on a circuit breaker trigger button. Same elements as in FIG. 1 are designated by same reference numerals. It will be noted that the arrangement is similar to that of the nut of FIG. 1, and the same tightness can be expected.

FIG. 4 shows a cross-section view of nut 25 inserted in a mould ready to receive a liquid material for forming membrane 33. The mould comprises a bottom half-mould 40 adapted to the shape of the bottom portion of nut 25 and in which is formed a print 41 for the bottom portion 33-2 of membrane 33. An upper half-mould 42 abuts against the upper face of nut 25 and limits the exterior of a print 43 for the upper portion 33-1 of membrane 33. A central kernel 45, also abutting against the upper face of nut 25, limits the interior of print 43. This kernel comprises an upper shaft 45-1 for centering the kernel in the upper half-mould and a bottom shaft 45-2 for centering the kernel in the bottom half-mould. An injection channel 47 arrives between the upper shaft 45-1 and the half-mould 42 at an annular chamber 48 about the upper shaft and communicating with the upper central part of print 43.

A moulding elastomeric material which will polymerize to form elastic membrane 33 is injected through channel 47, fills print 43, holes 29 and finally print 41. The air is evacuated through the clearance between the half-moulds and nut 25. Then, the mould is opened and kernel 45 can be extracted through orifice 35 (FIG. 2A) thanks to the elasticity of membrane 33.

An advantage of this moulding method is that, by only one injection of moulding material, both parts of membrane 33 are obtained fixed to each other and to nut 25. This method is at most as complex as a method for obtaining only membrane 20 of FIG. 1. A double injection for obtaining separately both portions of the membrane could be devised but would be more complex.

In order to improve the adhesion between the upper portion 33-1 of membrane 33 and groove 27, this groove 27 can be submitted to a processing which renders it jagged or particularly adherent to the material of membrane 33.

FIG. 5 shows an alternative of the embodiment of FIG. 2A. Same elements of the previous figures are designated by same reference numerals. This embodiment is different from that of FIG. 2A in that nut 25 is turned upside-down before moulding. As shown, the base of upper portion 33-1 of membrane 33 is maintained by shoulder 31 and the bottom portion 33-2 fills groove 27.

In order to simplify the manufacturing to the detriment of the retention of the upper portion 33-1, nut 25 can be devoid of shoulder 31 and groove 27, and comprise cylindrical ends around which are fitted portions 33-1 and 33-2.

Many alternatives and modifications of the invention will appear to those skilled in the art, especially the number of holes 29 or the material of membrane 33 can be selected to convenience. It can also be devised to manufacture a membrane 33 without central orifice 35 by using a kernel 45 which is destroyed after moulding.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

I claim:

1. A protection nut for screwing on a stud in which a button slides, comprising:

an internally threaded nut body;
an approximately bell-shaped elastic membrane mounted to one face of the nut body for fitting around or covering the button; and
an annular seal-ring mounted to an opposite face of the nut body, the membrane and the seal-ring forming only one part and being connected together through at least one through-hole of the nut body,
wherein the base of the bell-shaped membrane is fitted in a groove formed in the nut body so that said at least one through-hole opens in the groove.

2. A protection nut as claimed in claim 1, wherein:
the seal-ring is provided with an interior shoulder allowing it to be retained by an exterior shoulder of the nut body.

3. A protection nut as claimed in claim 1, wherein:
said membrane comprises a central orifice through which said button is meant to pass and having an initial diameter for being smaller than that of the button.

4. A protection nut as claimed in claim 1, wherein:
said membrane and said seal-ring are simultaneously obtained by only one introduction of moulding material in a mould containing said nut body.

5. A protection nut as claimed in claim 4, wherein:
a material for improving adherence is put in the groove before moulding.

6. A protection nut for screwing on a stud in which a button slides, comprising:
an internally threaded nut body;
an approximately bell-shaped elastic membrane mounted to one face of the nut body for fitting around or covering the button and an annular seal-ring mounted to an opposite face of the nut body, the membrane and the seal-ring forming only one part and being connected together through at least one through-hole of the nut body,
wherein the seal-ring is fitted in a groove formed in the nut body so that said at least one through-hole opens in the groove.

7. A protection nut as claimed in claim 6, wherein:
the base of the bell-shaped membrane is provided with an interior shoulder allowing it to be retained by an exterior shoulder of the nut body.

8. A protection nut as claimed in claim 6, wherein:
said membrane comprises a central orifice through which said button is meant to pass and having an initial diameter for being smaller than that of the button.

9. A protection nut as claimed in claim 6, wherein:
said membrane and said seal-ring are simultaneously obtained by only one introduction of moulding material in a mould containing said nut body.

10. A protection nut as claimed in claim 9, wherein:
a material for improving adherence is put in the groove before moulding.

* * * * *